United States Patent [19]
Mulla et al.

[11] Patent Number: 5,821,520
[45] Date of Patent: Oct. 13, 1998

[54] BAR CODE SCANNING SYSTEM WITH THE PRE-DECODING SIGNAL PROCESSING AND METHOD FOR BAR CODE CANDIDATE SELECTION FOR DECODING

[75] Inventors: Altaf Mulla, Merrick; Anthony Fama, Mastic; Thomas Boehm, Medford; Daniel Brown, E. Northport; William Sackett, Rocky Point, all of N.Y.

[73] Assignee: Symbol Technologies, Inc., Holtsville, N.Y.

[21] Appl. No.: 910,435

[22] Filed: Aug. 13, 1997

Related U.S. Application Data

[63] Continuation of Ser. No. 431,364, Apr. 28, 1995, abandoned.

[51] Int. Cl.⁶ .................................................. G06K 7/110
[52] U.S. Cl. ........................ 235/462; 235/413; 235/466
[58] Field of Search .................................. 235/462, 463, 235/466

[56] References Cited

U.S. PATENT DOCUMENTS

| | | | |
|---|---|---|---|
| 4,058,708 | 11/1977 | Sherer | 235/463 |
| 4,104,514 | 8/1978 | Sherer | 235/466 |
| 4,175,693 | 11/1979 | Nakashani | 235/463 |
| 4,855,581 | 8/1989 | Mertal et al. | 235/463 |
| 4,916,298 | 4/1990 | Raphael | 235/463 |
| 4,963,719 | 10/1990 | Brooks et al. . | |
| 5,144,118 | 9/1992 | Actis et al. . | |
| 5,241,164 | 8/1993 | Pavlidis et al. . | |
| 5,262,626 | 11/1993 | Goren et al. . | |
| 5,278,398 | 1/1994 | Pavlidis et al. . | |
| 5,311,001 | 5/1994 | Joseph et al. . | |
| 5,319,181 | 6/1994 | Shellhammer et al. . | |
| 5,343,027 | 8/1994 | Knowles et al. . | |
| 5,369,264 | 11/1994 | Rosa et al. . | |
| 5,457,309 | 10/1995 | Pelton | 235/472 |
| 5,481,098 | 1/1996 | Davis et al. | 235/472 |

*Primary Examiner*—Harold Pitts

[57] ABSTRACT

A system for processing output signals of an electro-optical scanner adapted for reading a bar code indicia having parts of different light reflectivity and non bar code indicia adjacent the bar code on an article being scanned comprises a decoder for decoding content of signals input thereto and signal processing circuitry for receiving the scanner output signals and generating input signals for input to the decoder by deleting signals having non bar code indicia content from the received scanner output signals by examining characteristics of the received scanner output signals. The signal processing circuitry is adapted to generate input signals for input to the decoder for bar code indicia of respective different bar code symbologies. The signal processing circuitry includes deletion circuitry for deleting, from the received scanner output signals, signals having less time duration than a predetermined time duration. The signal processing circuitry also includes one or both of first ratio computation means for computing a ratio of characteristics of adjacent of the received scanner output signals and second ratio computation means for computing a ratio of characteristics of non-adjacent of the received scanner output signals.

33 Claims, 9 Drawing Sheets

BAR CODE SCANNING SYSTEM WITH THE PRE-DECODING SIGNAL PROCESSING AND METHOD FOR BAR CODE CANDIDATE SELECTION FOR DECODING

This application is a continuation of application Ser. No. 08/431,364, filed Apr. 28, 1995, now abandoned.

BACKGROUND OF THE INVENTION

1. Field of the Invention

The present invention relates generally to an optical scanning system and method of scanning and pertains more particularly to high speed omni-directional bar code scanning.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are decoded into a alphanumerical characters that are intended to be descriptive of the article or some characteristic thereof. Such characters are typically represented in digital form and utilized as an input to a data processing system for applications in point-of-sale processing. Inventory control, and the like scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, light beam, at a target and a symbol to be read.

The light source in a laser scanner is typically a gas laser or semiconductor laser. The use of a semiconductor devices such as a laser diode as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates a detector based upon charge coupled device (CCD) technology. In such readers size of the detector is larger than or substantially the same as the symbol to be read. The entire symbol is flooded with light from the reader, and each CCD cell is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user.

In various applications, scanning systems are required to have facility for reading randomly-oriented bar code symbols and for changing the size or shape of the scanning pattern. For such purposes, the art has come to rely on so-called "omni-directional" scanners. Conventional point-of-sale (POS) of the type generally found in supermarkets that have been built into and underneath checkout counters deflect a laser beam in several directions and read symbols oriented in different directions that move across the reference plane, i.e., in the plane of or slightly above the countertop. To deflect the laser beam, a central mirrored polygon surround by a ring of many auxiliary mirrors is mounted below the countertop, each auxiliary mirror corresponding to a different scan line. Omni-directional scanners are disclosed particularly in commonly-assigned U.S. Pat. Nos. 5,059,779 and No. 4,871,904.

A characteristic of omni-directional scanners is that they tend to provide many scan lines of useless, non bar code data (noise), while few scan lines contain the real (bar code) data. The non bar code data can overwhelm the decode processing system, preventing it from fully utilizing all of the real (bar code) data.

In a known omni-directional scanning system, an acquisition system having a timer/counter or microprocessor is responsive to a DBP (digital bar pattern) signal to store scanner output data in a random access memory (RAM). The data is stored on each transition of the DBP signal, creating many buffers of DBP signals. The microprocessor wades through the DBP signals and tries to determine that scan line of data is not a bar code candidate based on its length. In that case, the microprocessor clears the RAM as respects the failed candidate scan line of data. Where the microprocessor determines the scan line to be a bar code candidate, it endeavors to decode the same through microprocessor algorithms particular to the symbology of the bar code.

Various problems attend this situation. The acquisition system does not process scans of data as quickly as they are generated by the scanner. On-line memory tends to be completely used and the collection of new data is stopped, i.e., the acquisition system goes into a "pause". If the memory is filled with non-decodeable data at the time of a pause and the real bar code data then comes into the scanner field of view, the real bar code data is of course missed.

Another disadvantage of the described system is that it steals computing bandwidth from the microprocessor. For example, assuming each scan element to be loaded to require about five hundred nanoseconds, and the scan to comprise one hundred scan elements, fifty microseconds is consumed by the loading process. Assuming further that each scan takes seven hundred and fifty microseconds, the loading process occupies almost seven percent of scan time. This is especially important for graphically intensive labels, because the microprocessor bandwidth loss is increased as the need for the microprocessor to process data is also increased. In other words, there is less processing power available to do more work.

Known prior art solutions to the problem have included varied implementations of hardware circuits for decoding of specific individual bar code symbologies, e.g., a UPC decode circuit or a Code 39 decode circuit. This brute force approach depends on the failure of the decoding circuit to reject the input stream but yields inflexibility in the decoding algorithms, requiring a separate and specific decoding circuit for each different type of bar code symbology.

SUMMARY OF THE INVENTION

A primary object of the present invention is to overcome the foregoing problems of heretofore known omni-directional scanning systems.

A particular object of the invention is to eliminate decoding microprocessor bandwidth loss attributable to scan element loading in omni-directional scanning systems.

A further particular object of the invention is to lessen decoding microprocessor time spent on decoding non bar code data.

Broadly stated, the invention attains these and other objects by implementing quiet zone (margin) detection algorithms, which are common to most if not all bar code symbologies, and rejects input data streams based on the number of data elements between very large bars or spaces which again is common to most if not all bar code symbologies.

In a first aspect, the invention provides a system for processing output signals of an electro-optical scanner adapted for reading a bar code indicia having parts of different light reflectivity and non bar code indicia adjacent the bar code on an article being scanned. The system is adapted for use with plural, different symbologies and comprises a decoder for decoding content of signals input thereto and signal processing means for receiving the scanner output signals and generating input signals for input to the decoder by deleting signals having non bar code indicia content from the received scanner output signals by examining characteristics of the received scanner output signals.

The signal processing means preferably includes deletion means for deleting, from the received scanner output signals, signals having less time duration than a predetermined time duration.

The signal processing means also preferably includes one or both of first ratio computation means for computing a ratio of characteristics of adjacent of the received scanner output signals and second ratio computation means for computing a ratio of characteristics of non-adjacent of the received scanner output signals.

In a second aspect, the invention provides a signal processor for processing output signals of an electro-optical scanner adapted for reading a bar code indicia having parts of different light reflectivity and non bar code indicia adjacent the bar code on an article being scanned, the processor being adapted for use with plural, different symbologies and comprising signal processing circuitry for receiving the scanner output signals and examining time-based characteristics of the received scanner output signals. The signal processor likewise preferably comprises the above noted deletion means and one or both of the ratio computing means.

In other aspects, the invention provides improvements in signal processors, which can be directed to individual bar code symbologies for processing output signals of an electro-optical scanner adapted for reading a bar code indicia having parts of different light reflectivity and non bar code indicia adjacent the bar code on an article being scanned, the processor comprising signal processing circuitry for receiving the scanner output signals and examining time-based characteristics of the received scanner output signals, the processing circuit including deletion means for deleting, from the received scanner output signals, signals having less time duration than a predetermined time duration.

Further, the invention provides a signal processor for processing output signals of an electro-optical scanner adapted for reading a bar code indicia having parts of different light reflectivity and non bar code indicia adjacent the bar code on an article being scanned, the processor comprising signal processing circuitry for receiving the scanner output signals and examining time-based characteristics of the received scanner output signals, the processing circuitry including ratio computation means for computing a ratio of characteristics of adjacent of the received scanner output signals.

Still further, the invention provides a signal processor for processing output signals of an electro-optical scanner adapted for reading a bar code indicia having parts of different light reflectivity and non bar code indicia adjacent the bar code on an article being scanned, the processor comprising signal processing circuitry for receiving the scanner output signals and examining time-based characteristics of the received scanner output signals, the processing circuitry including ratio computation means for computing a ratio of characteristics of non-adjacent of the received scanner output signals.

BRIEF DESCRIPTION OF THE DRAWINGS

The foregoing objects and advantages of the present invention may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
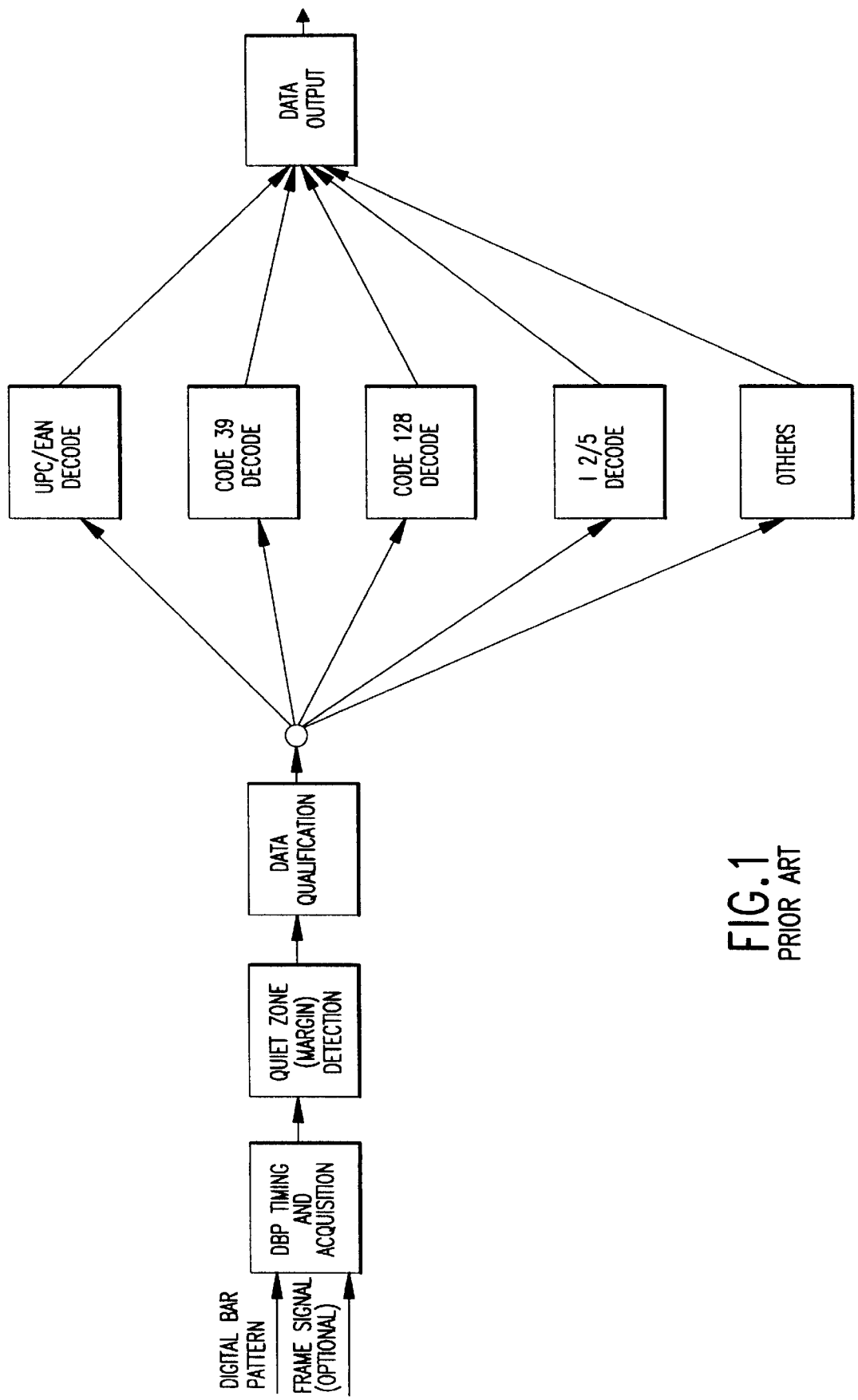
FIG. 1 is a diagram showing time ordered steps typically required to decode a bar code.

Referring to FIG. 1, typical time ordered steps required to decode a bar code include inputting a scanner output (Digital Bar Pattern or DBP) and, optionally, a Frame Signal. The next step is that of DBP timing and acquisition, where the input DBP is synchronized with a system microprocessor clock. There follows a Quiet Zone (margin) detection step and a Data Qualification step, wherein margins are identified and data is qualified for decoding. FIG. 1 illustrates four known decoding facilities, UPC/EAN, Code 39, Code 128, and I 2/5. The box labeled "Others" is intended to indicate that other symbologies may be addressed. The symbologies may be one-dimensional or two-dimensional, an example of the latter being PDF417. All symbologies are decodable by software algorithms operating on a microprocessor.

Figure 2:
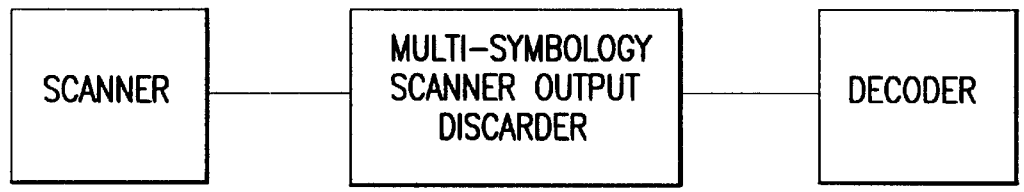
FIG. 2 is a general block diagram of a system in accordance with the invention.

Turning to FIG. 2, the overall system of the invention includes a scanner, a multi-symbology scanner output discarder and a decoder.

Figure 3:
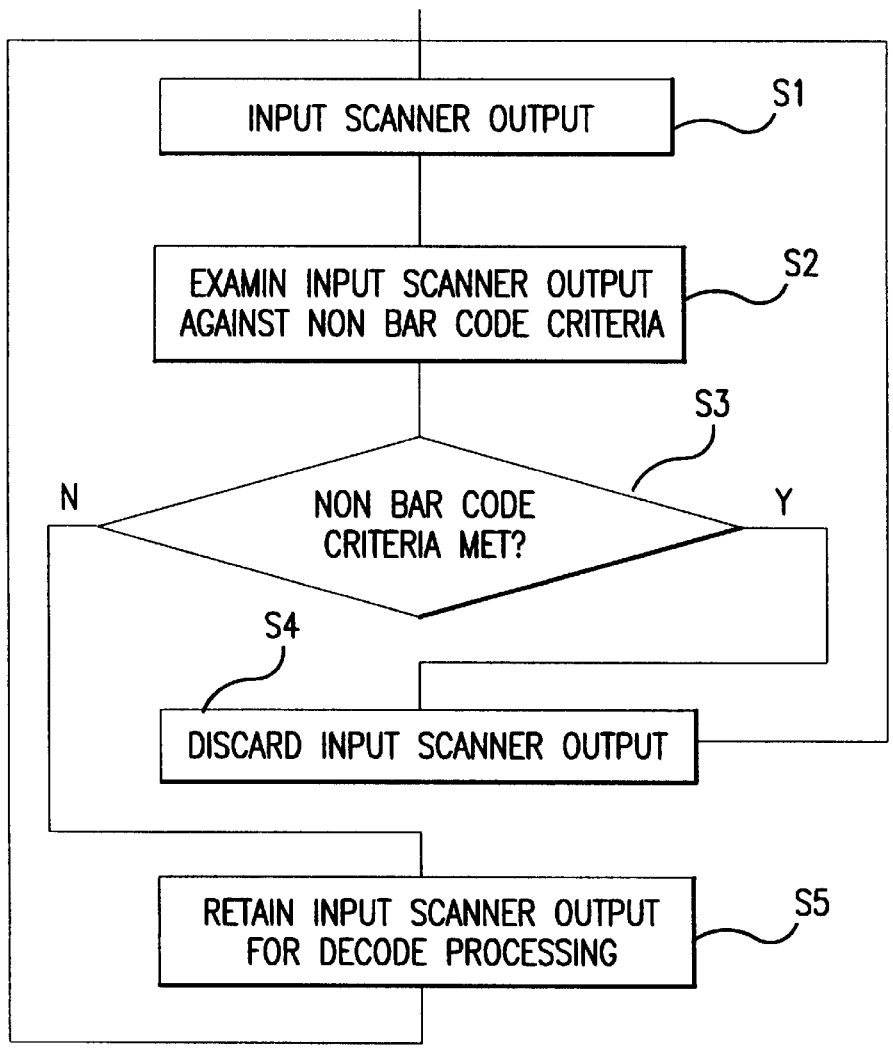
FIG. 3 is a flow chart depicting in general the routine implemented in the FIG. 2 system.

Prior to detailed discussion of the makeup of the multi-symbology scanner output discarder, reference is made to FIG. 3 and its flow chart of overall activity in the discarder.

In step S1, INPUT SCANNER OUTPUT, a succession of DBPs is input. In step S2, EXAMINE INPUT SCANNER OUTPUT AGAINST NON BAR CODE CRITERIA, the succession of DEPs is tested per criteria below set forth in detail. In step S3, ? NON BAR CODE CRITERIA MET, inquiry is made as to the results of the step S2 examination. If the answer is in the affirmative (Y), the input scanner output is discarded in step S4, DISCARD INPUT SCANNER OUTPUT and return is to step S1. If the answer is negative (N), the input scanner output is saved in step S5, STORE INPUT SCANNER OUTPUT, and return is to step S1.

The non bar code data is usually generated from the scan line passing over graphics surrounding the bar code. While the bar code is comprised of a large number of dark and light spaces, typically greater than fifteen, surrounded by two large light spaces (margins), non bar code data is not as regular and tends often to have large spaces mixed in the middle of a short string of smaller dark and light spaces. Per the subject invention, use is made of this tendency to distinguish non bar code data from bar code data, and to remove much of the non bar code data before the decode processing stage. This is done by marking large spaces, both dark and light, as possible scan partitions.

There are four tests by which a DBP can be so marked or "tagged": (1) a transition occurs during the width (time duration) of a DBP, i.e., a new DBP starts; (2) the DBP width exceeds a predetermined width, termed an "absolute overflow; (3) the DBP pulse width is larger than its immediate left or right neighbors by a given ratio; and (4) the DBP pulse width is larger than the minimum of the three closest same polarity (bar or space) elements on either the left or right side by a given ratio. Test (3) is termed a "one-level-ratio" test (4) is termed a "three-level-ratio" test.

Figure 4:
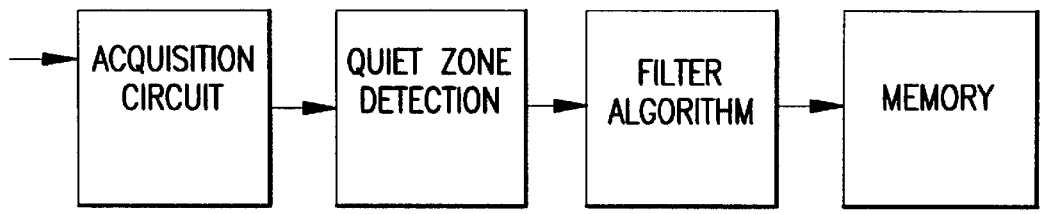
FIG. 4 is a general block diagram of the scanner output discarder of FIG. 2.

FIG. 4 is a general block diagram of the scanner output discarder of FIG. 2 which includes an acquisition circuit, in which certain filtering occurs and tests (1) and (2) above noted are performed, a quiet zone detection, in which tests (3 and (4) above noted are performed, a filter algorithm, discussed hereinafter, and a memory.

Figure 5:
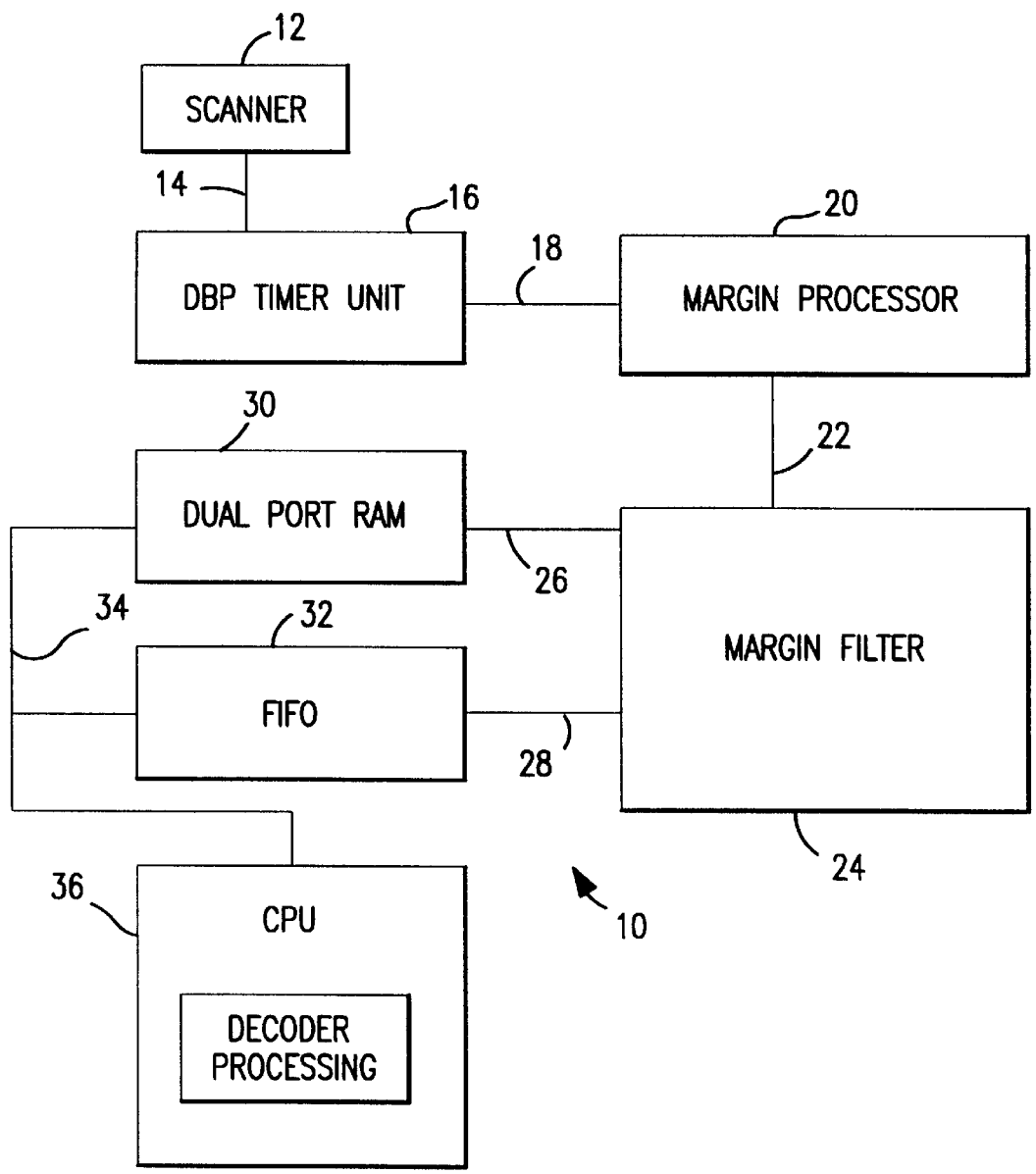
FIG. 5 is a functional block diagram of the scanner output discarder of FIG. 2.

Referring to FIG. 5, system 10 of the invention includes omni-directional scanner 12, which furnishes run length encoded (RLE), also termed a digital bar pattern (DBP) signals, over lines 14 to DBP timer unit 16.

DBP timer unit 16 provides output signals on lines 18 indicative of DBP widths or counts, indicative of polarity, i.e., bar or space, and indicative of starts of scan (SOS), furnishing the signals to margin processor 20.

Margin processor 24 provides output signals on lines 22 indicative of tagged and untagged DBPs and furnishes them to margin filter 24, which communicates over lines 26 and 28 respectively with dual port RAM 30 and FIFO 32. Dual port RAM 30 and FIFO 32 are connected over bus 34 with microprocessor (CPU) 36.

DBP timer unit 16 is the first stage of the data acquisition system. Its purpose is to monitor the inputs DBP and SOS, converting these events into data usable by the system. The DBP is timed from edge to edge, the result being a twelve-bit count of the DBP duration. If an SOS transition occurs while a given DBP is being timed, that DBP is tagged as an SOST (SOS tagged). DBP counts are also tagged as SOSTs if the DBP timer exceeds its maximum value, which is programmable. This is the absolute overflow condition noted above.

Figure 6:
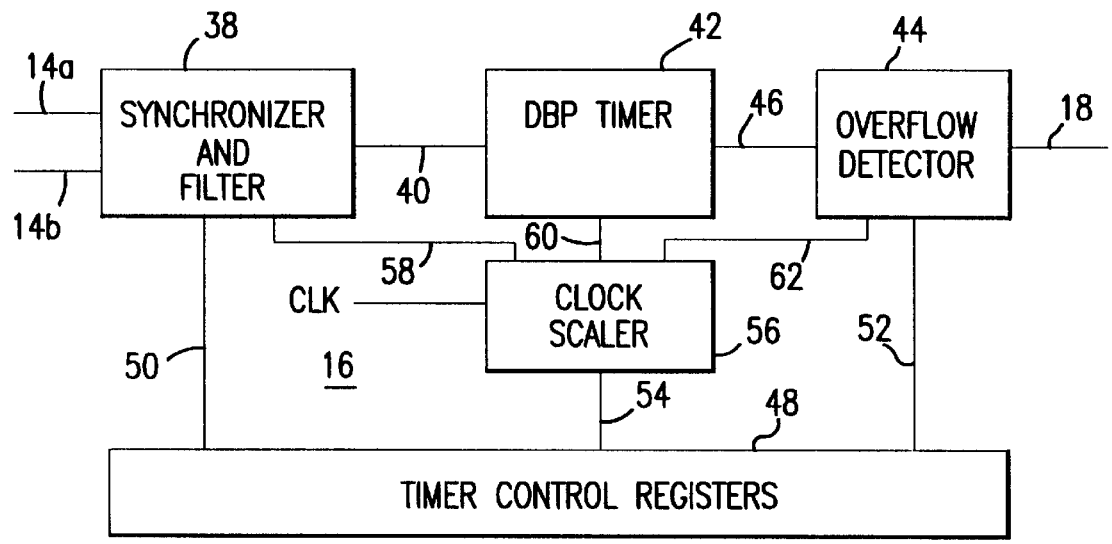
FIG. 6 is a functional block diagram of the DBP timer unit of FIG. 5, shown with a scanner.

DBP timer unit 16 may be configured as shown in FIG. 6. Input line 14a provides the scanner output DBPs and input line 14b provides the scanner output SOS signal to synchronizer and filter 38. This component performs two functions. The first is to synchronize the asynchronous inputs DBP and SOS, to the internal system clock (CLK). The second function is to digitally filter small DBP pulses from input DBPs and to furnish the filtered DBPs over lines 40 to DBP timer 42. SOSs are conveyed to timer 42 also over lines 40 and the timer includes circuitry for tagging DBPs where an SOS occurs during the time counting of a DBP. The timer output indicative of counted DBP time duration and DBPs, tagged and untagged are furnished to overflow detector 44 over lines 46. This unit tags DBPs where the time count indication is in excess of a predetermined time count. DBPs, tagged and untagged, are furnished on lines 18, together with indication of polarity, and DBP time counts.

DBP timer control registers 48 provide a signal on line 50 for control of the digital filtering in synchronizer and filter 38 and provide signals on line 52 indicative of the programmable overflow value. Registers 48 also provide a signal on line 54 for DBP timer scaling, which is performed by clock prescaler 56, which is settable to reduce the DBP count rate, usually for lower spot speeds. The operating clock so scaled is conveyed by lines 58, 60 and 62 to synchronizer and filter 38, to DBP timer 42 and to overflow detector 44.

Figure 7:
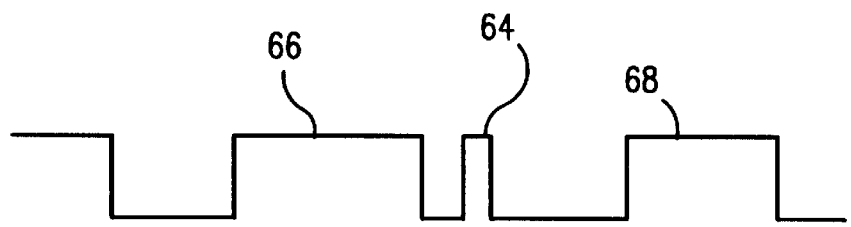
FIG. 7 shows a pulse train prior to filtering in the synchronizer and filter of FIG. 5.
Figure 8:
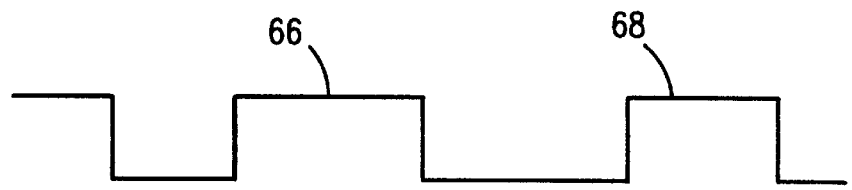
FIG. 8 shows the FIG. 5 pulse train following filtering in the synchronizer and filter of FIG. 5.

FIGS. 7 and 8 are illustrative of the operation of the filter portion of synchronizer and filter 38. In FIG. 7, the DBP includes a small pulse 64 between HI pulses 66 and 68. In FIG. 8, pulse 64 is not present, having been filtered. The filter is included to assure the DBP acquisition system of a minimum pulse width. This is accomplished by counting scaled clock cycles before considering a DBP edge to be valid. If a DBP edge is invalid, meaning it changed before the programmed number of clock cycles, the edge is ignored, thus extending the previous pulse. In FIG. 7, the LO between HI pulses 66 and 68 is inclusive of the time period occupied by the omitted pulse 64. The filtering factor is typically five prescaled clock cycles and can be changed by setting the DBP filter factor stored in registers 48.

Figure 9:
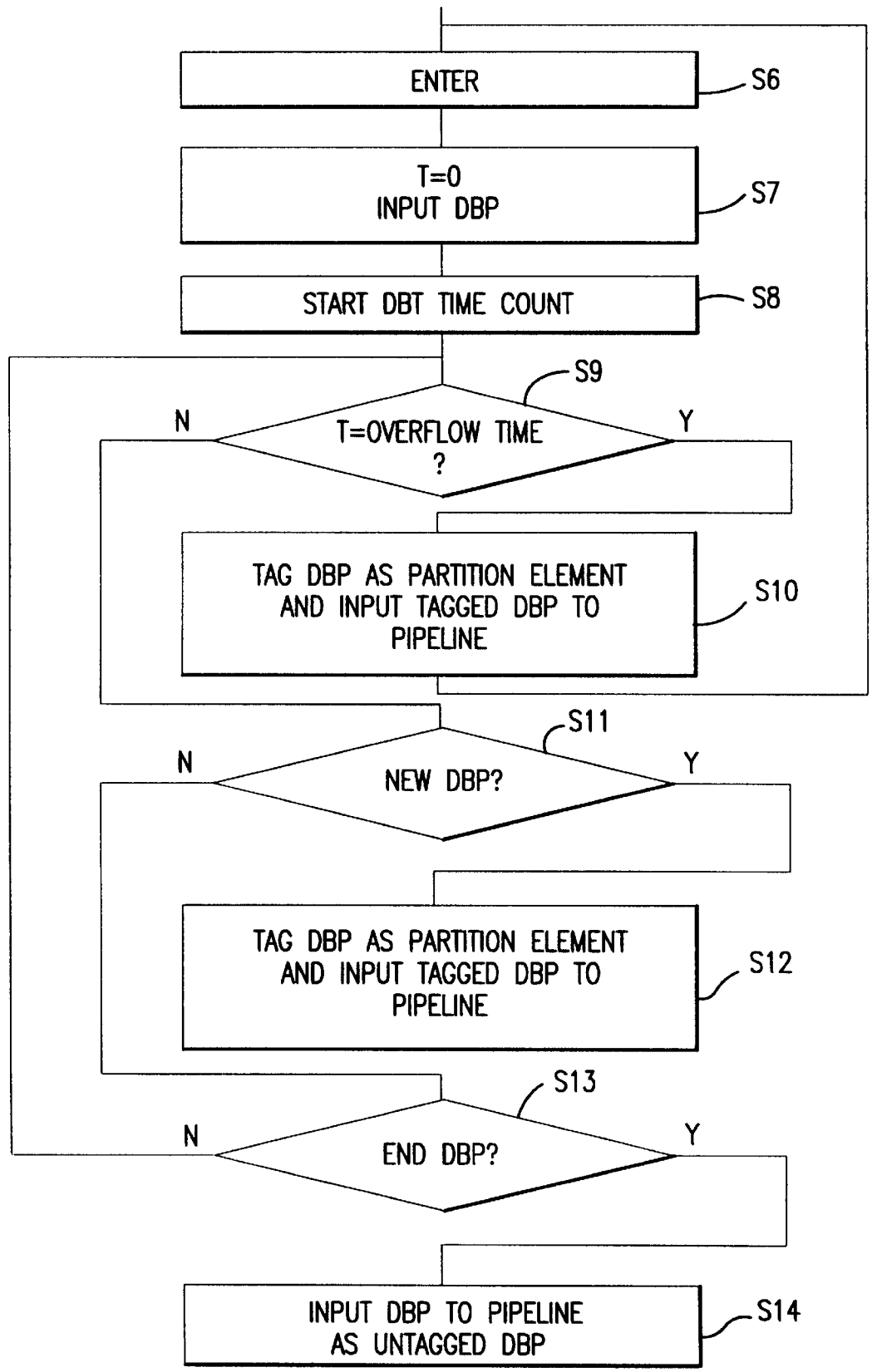
FIG. 9 is a flow chart depicting in general the routine implemented in the DBP timer and overflow detector of FIG. 8.

FIG. 9 shows a flow chart of the routine implemented in timer 42 and detector 44 of FIG. 6. The routine is entered in step S6, ENTER. In step S7, T=0 INPUT DBP, the DBP timer is reset and a DBP is input. In step S8, START DBP TIME COUNT, measurement of the time duration of the input DBP is commenced. In step S9, ? T=OVERFLOW TIME, inquiry is made as to whether the measured time duration exceeds the predetermined time. If the inquiry is affirmatively answered, progress is to step S10, TAG DBP AS PARTITION ELEMENT AND INPUT TAGGED DBP TO PIPELINE. The pipeline, below discussed, is a series of FIFO registers each containing a DBP, its polarity and indication of whether or not the DBP is tagged.

If the answer to the step 9 inquiry is in the negative, progress is to step S11, ? NEW DBP, where inquiry is made as to whether an SOS has occurred during the counting of the DBP. Upon affirmative answer to the inquiry, progress is to step S12, TAG DBP AS PARTITION ELEMENT AND INPUT TAGGED DBP TO PIPELINE.

Upon negative answer to the step S11 inquiry, progress is to step S13, ? END DBP, and inquiry is made as to whether the counting of the duration of the DBP is complete. If no, return is made to step S9 for continued inquiry during DBP counting. If yes, progress is to step S14, INPUT DBP TO PIPELINE AS UNTAGGED DBP.

Margin processor 24 receives DBP information on lines 18 from DBP timer unit 16 and implements tests (3) and (4) above noted.

The calculation for test (3) is performed by comparing the DBP count that is in the second data position to its immediate left and right neighbors. For a DBP to be tagged under test (3), its DBP count must be greater or equal to "n" (n being, e.g., eight) times one of the neighbors.

Figure 10:
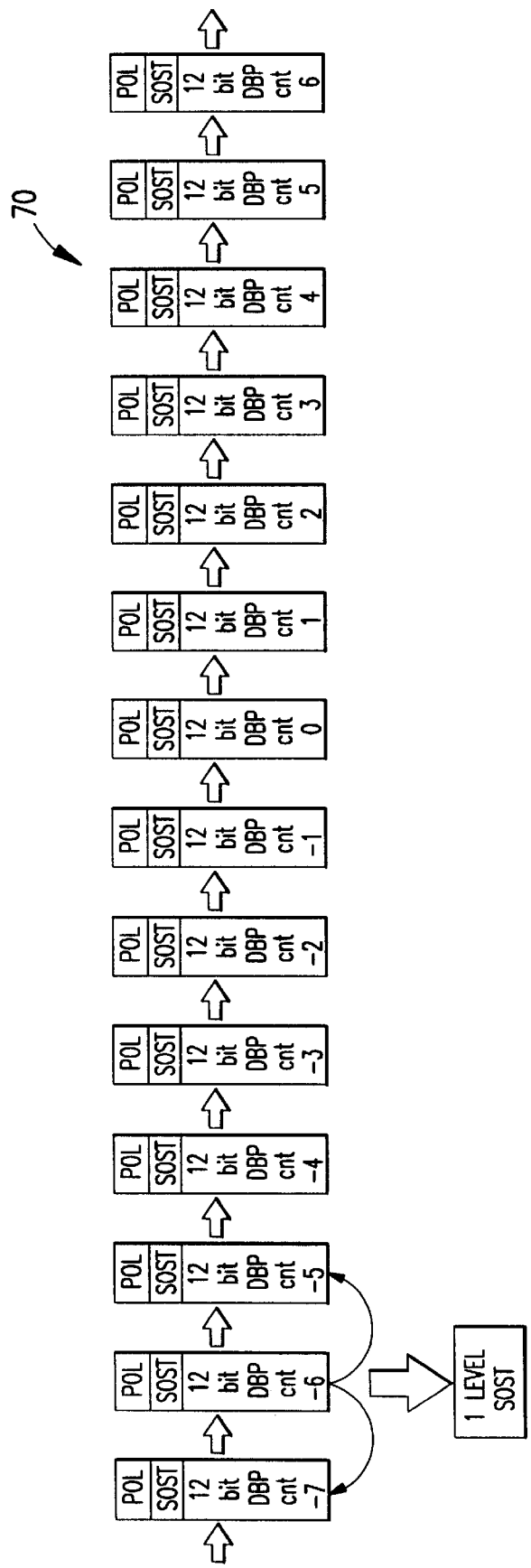
FIG. 10 shows a pipeline of the margin processor of FIG. 5, with graphical indication of a first margin processing algorithm in accordance with the invention.
Figure 11:
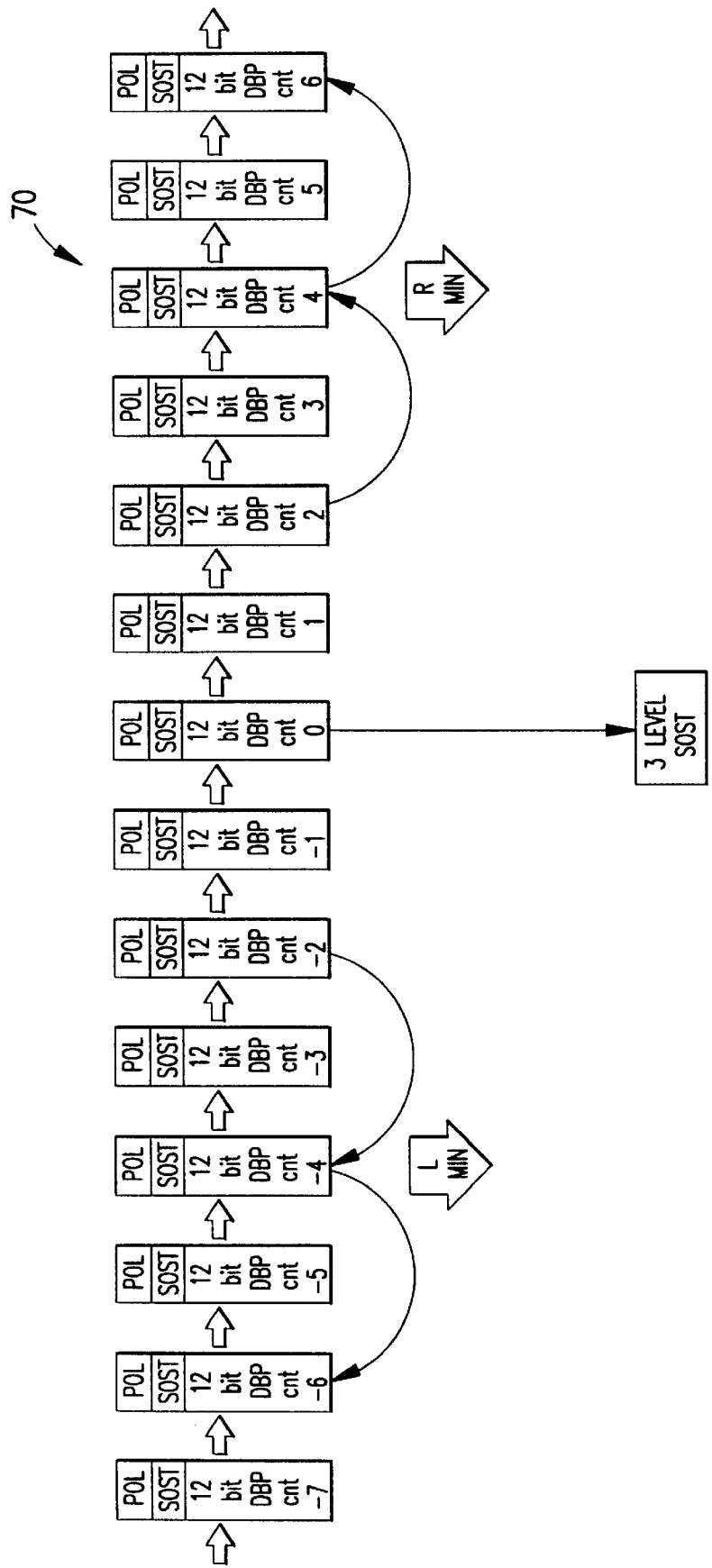
FIG. 11 shows the FIG. 10 pipeline with graphical indication of a second margin processing algorithm in accordance with the invention.

FIG. 10 shows a fourteen stage pipeline 70 of DBP counts, polarity and tags (SOST bits of HI) and graphically depicts the one-level-ratio stages, i.e., data_pipe[-6] has its DBP count compared to those of data_pipe[-5] and data_pipe[-7] and the tagging of a "1 level sost".

On a continuous basis, an element in the data position (L6) generates the following ratios: element (L6)/left element of different polarity (L7); and element (L6)/right element of different polarity (L5). If the ratio is greater or equal to "n" the element in the data position (L6) is marked as a partitioning element.

The calculation for test (4) involves comparing the DBP count in the data_pipe[0] location to the minimum of the three same polarity elements in both the left and right directions (data_pipe[2,4,6] and data_pipe[-2,-4,-6]. These minimums are called R-min and L-min. The minimums are calculated center out, and will not cross scan boundaries. For example, if the count in the data_pipe[-5] is tagged, i.e., marked with its SOST bit set, only positions data_pipe[-2] and data_pipe[-4] will be considered as minimums. For a DBP to be considered a partitioning element under test (4), the count must be greater than n times L-min, or R-min.

On a continuous basis, an element in the data position (C) generates the following ratios: element (C)/minimum of three same polarity elements on left (L2,L4,L6); and element (C)/minimum of three same polarity elements on right (R2,R4,R6). If the ratio is greater or equal to "n" the element in the data position (C) is marked as a partitioning element.

Returning to FIG. 5, DBP counts are stored in RAM 40. Tags (partitions) and the address in the RAM of the DBP count associated with the tags are stored in the FIFO. Margin filter 24 maintains the address pointers for writing to RAM 40 and performs a scan filtering algorithm below discussed in connection with FIG. 12. Data is stored in RAM 40 and FIFO 48 until a succeeding partition element arrives. If the scan length criterion is met, then the new partition element is stored as an end of scan signal and a new scan is begun. If the scan length criterion is not met, then the RAM 40 write pointer is reset to the end of the previous complete scan, and the tag information in FIFO 48 is cleared back to the last scan. Hence, the "short" scan is flushed from memory with no decoding activity by the decoder processing portion of CPU 36 in respect thereof.

Figure 12:
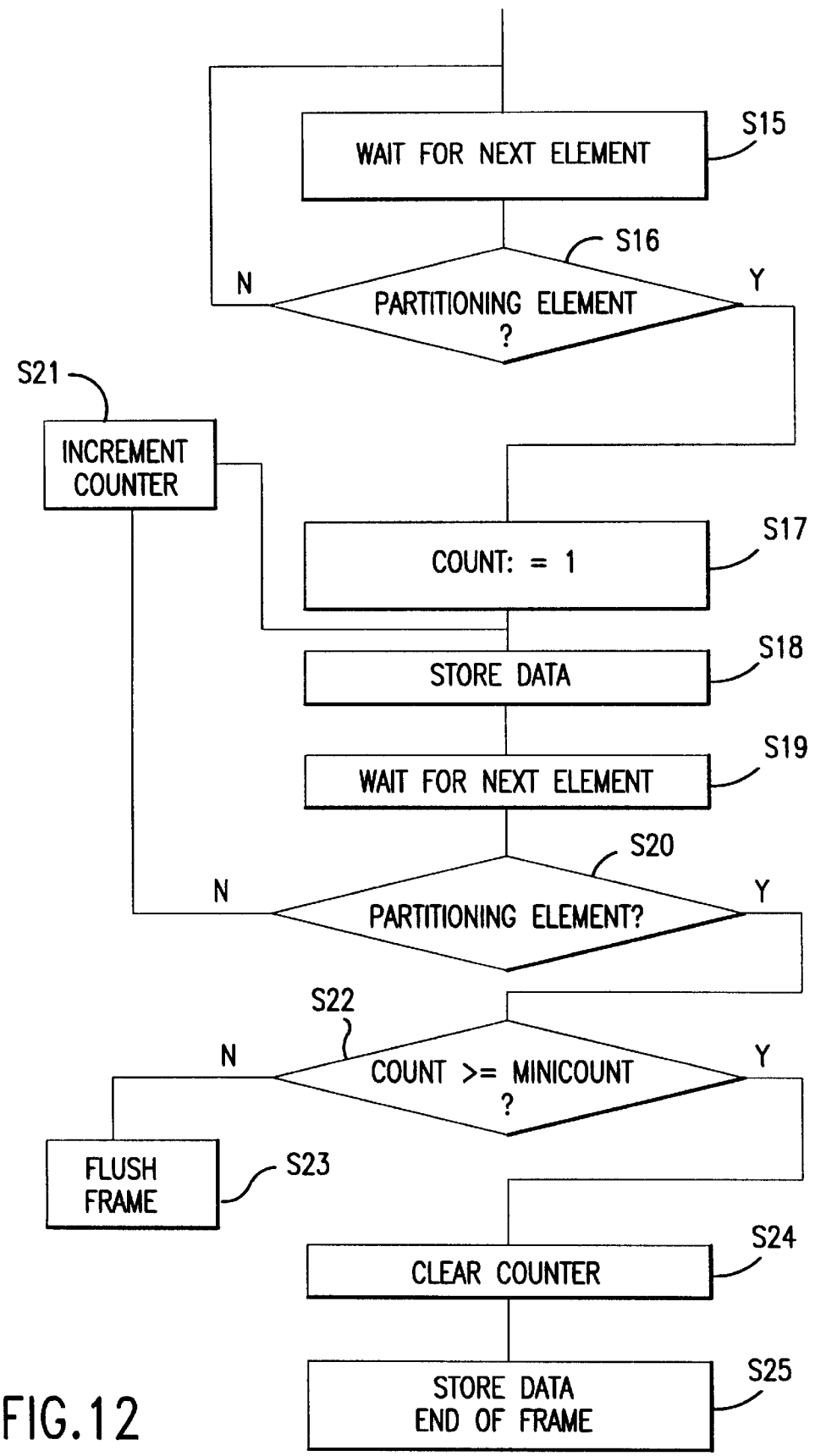
FIG. 12 is a flow chart of a filtering algorithm in accordance with the invention.

Turning to FIG. 12, step S15, WAIT FOR NEXT ELEMENT, the system stands in readiness for element (DBP) processing. On receipt of an element, progress is to step S16, ? PARTITIONING ELEMENT, inquiry is made as to whether the element has been tagged as a partitioning element. If not, return is made to step S15. If yes, progress is to step S17, COUNT:=1, wherein a counter is initialized.

In step S18, STORE DATA, the element is stored, and progress is to step S19, WAIT FOR NEXT ELEMENT. Upon receipt thereof, progress is to step S20, ? PARTITIONING ELEMENT, where inquiry is made as to whether the subsequent element has been tagged as a partitioning element. If not, progress is to step S21, INCREMENT COUNTER, where the counter initialized in step S17 is incremented by one, and return is to step S18, where the subsequent element is stored. Steps S19 and S20 are repeated. This sequence continues until such time as the inquiry of step S20 is affirmatively answered, i.e., a succession of elements between two partitioning elements has been received and stored.

Inquiry is now made in step S22, ? COUNT>= MINCOUNT, as to whether the number of elements received is equal to or less than a predetermined minimum number corresponding to a real bar code. if not, progress is to step S23, FLUSH FRAME, and the memory used for practicing step S18 is cleared of its stored contents. Where the answer to the step S22 inquiry is in the affirmative, progress is to step S24, CLEAR COUNTER, where the counter used in steps S17 and S21 is reset to zero count, and then to step S25, STORE DATA END OF FRAME, where the data is stored in memory serving the decoder processing portion of the CPU.

Figure 13:
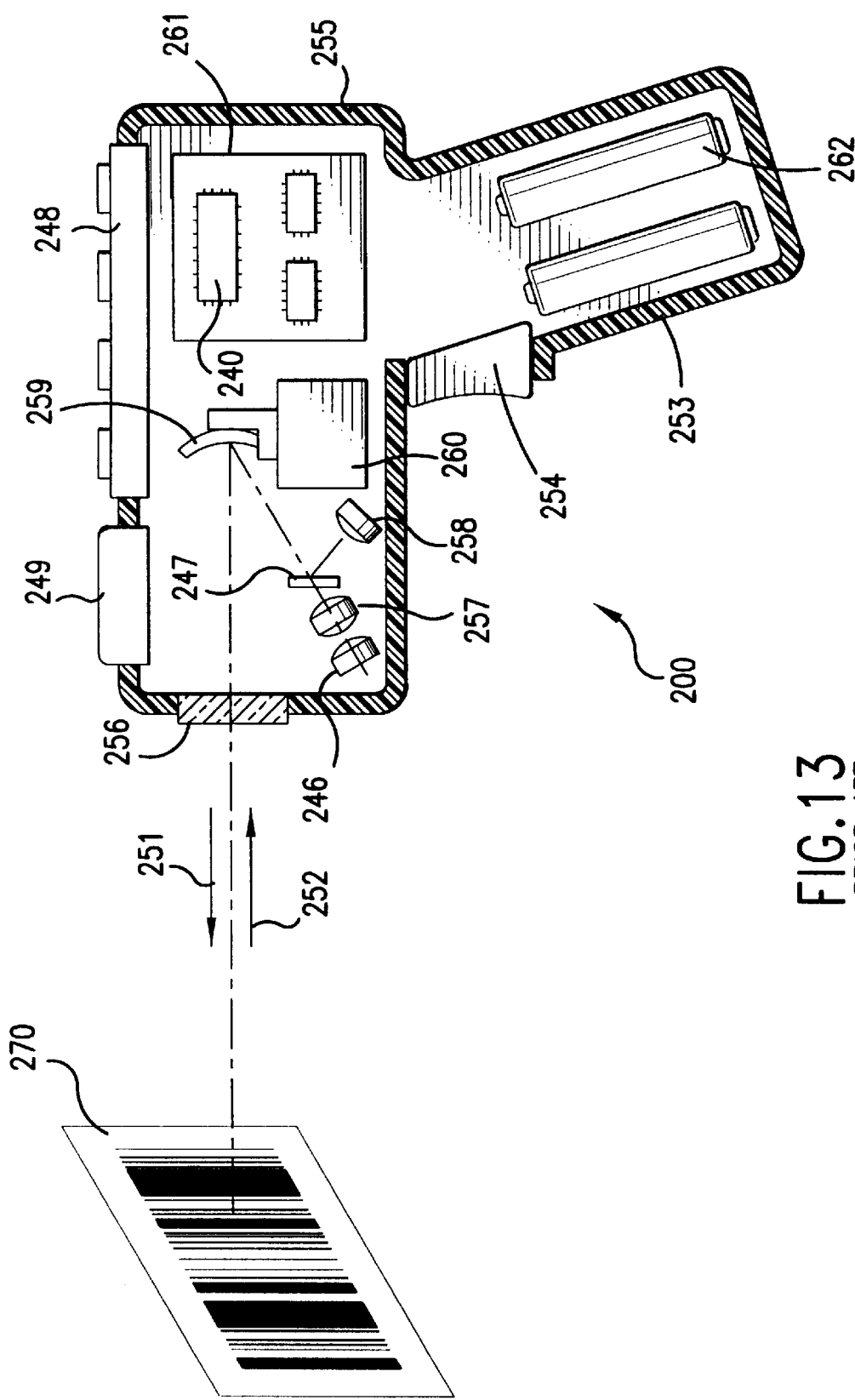
FIG. 13 illustrates a highly simplified embodiment of one type of bar code reader that may be modified to utilize the same in practicing the present invention.

FIG. 13 illustrates a highly simplified embodiment of one type of bar code reader that may be modified to utilize the same in practicing the present invention. A reader may be implemented in a hand-held scanner, as illustrated, or a desk-top work station or stationery scanner. In a preferred embodiment, the arrangement is implemented in a housing 255 that includes an exit port 256 through which an outgoing laser light beam 251 is directed to impinge on, and to be scanned across, symbols 270 located exteriorly of the housing.

The hand-held device of FIG. 13 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 13. These U.S. Pat. Nos. 4,760,248, 4,896,026 and 4,409,470 are incorporated herein by reference, but the general design of such devices will be briefly described here for reference.

Referring to FIG. 13 in more detail, an outgoing light beam 251 is generated in the reader, usually by a laser diode or the like, and directed to impinge upon a bar code symbol disposed on a target a few inches from the front of the reader unit. The outgoing beam 251 is scanned in a scan pattern, and the user positions the hand-held unit so this scan pattern traverses the symbol to be read. Reflected and/or scattered light 252 from the symbol is detected by a light-responsive device 252 in the reader unit, producing serial electrical signals to be processed and decoded for reproducing the data represented by the bar code. As used hereinafter, the term "reflected light" shall mean reflected and/or scattered light.

In a preferred embodiment, the reader unit is a gun shaped device having a pistol-grip type of handle 253. A movable trigger 254 is employed to allow the user to activate the light beam 251 and detector circuitry when the user has positioned the device to point at the symbol to be read. A light-weight plastic housing 255 contains the laser light source 246, the detector 258, the optics 257, 247, 289, and signal processing circuitry including a detector and the CPU 240 as well as power source or battery 262. A light-transmissive window 256 in the front end of the housing 255 allows the outgoing light beam 251 to exit and the incoming reflected light 252 to enter. The reader is designed to be aimed at a bar code symbol by the user from a position in which the reader is spaced from the symbol, i.e., not touching the symbol or moving across the symbol. Typically, this type of hand-held bar code reader is specified to operate in the range of perhaps several inches.

The reader my also function as a portable computer terminal, and include a keyboard 248 and a display 249, such as described in the previously noted U.S. Pat. No. 4,409,470.

As further depicted in FIG. 13, a suitable lens 257 (or multiple lens system) may be used to focus the scanned beam onto the bar code symbol at an appropriate reference plane. A light source 246 such as a semiconductor laser diode is positioned to introduce a light beam into the axis of the lens 287, and the beam passes through a partially silvered mirror 247 and other lenses or beam-shaping structure as needed, along with an oscillating mirror 259, which is attached to a scanning motor 260 activated when the trigger 254 is pulled. If the light produced by the source 246 is not visible, an aiming light may be included in the optical system. The aiming light, if needed, produces a visible-light spot which may be fixed, or scanned just like the laser beam; the user employs this visible light to aim the reader unit at the symbol before pulling the trigger 254.

By way of summary and enhancement of the foregoing, the invention will be seen to address a major problem in reading barcode symbol on products with an omni-directional scanner is the huge amount of data generated by graphics and text commonly found around the barcode. This unwanted data overloads the microprocessor and causes it to lag in decoding the real data or even worse not capture the barcode data due to memory buffer overflow. Such a system suffers from poor response time and low first pass read rate.

The invention implements algorithms that determine whether scanned data is from a barcode, or from text and graphics, and filters out the latter. The bar code pre-processor algorithms are based on the observation that an element in the data stream which is a large multiple of its neighboring elements cannot possibly be part of the barcode. The ratio of the widest element of a barcode to the narrowest element is bounded for a given set of symbologies to a small factor. Additionally, margins or quiet zones, preceding and following the barcode pattern is at least twice the above factor, i.e., n. Any element that exhibits such a large relative size of n, can be treated as a partition across which a barcode symbol cannot exist.

Ratiometric comparisons are performed on a continuous basis over a finite neighborhood in a hardware logic, and checked under tests, such as tests (1)–(4) above to determine whether it is a non-barcode element or part of legitimate barcode. These non-barcode or partitioning elements decompose the text and graphics into smaller frames. Only frames with enough elements, bounded by partitions that could form a barcode or part thereof, are presented to the microprocessor for decoding. The rest of the data is rejected.

Another important function of the pre-processor, i.e., the circuitry prior to the decoding portion of the CPU, is to minimize the impact of noise in the digitized data. Elements that are narrower than the narrowest possible element, that a scanner's focus and digitizer can resolve are assumed to be the result of noise, and are merged into the surrounding elements.

It is found that the pre-processor rejects a quite substantial percent of non-barcode data. It is also found that the relative performance of system with and without the pre-processor is substantial in that the former achieves a superior first pass read rate as against the latter, which is maintained even at high speeds, thereby giving user a consistent performance.

The pre-processor can be employed in other applications other than herein discussed to reject text and graphics surrounding barcodes. Systems incorporating this technique will derive the benefit of a higher scan rate using an inexpensive microprocessor and small memory buffers, thereby reducing overall system cost while achieving aggressive performance.

While several embodiments and variations of the present invention for a bar code scanning system with pre-decoding signal processing and method for bar code candidate selection are described in detail herein, it should be apparent that the disclosure and teachings of the present invention will suggest many alternative designs to those skilled in the art.

What is claimed is:

1. A scanning system for processing a first output signal comprising a bar code pattern and a non-bar-code pattern, each one of said patterns comprising a number of pulses, said system comprising:
   (a) a decoder for decoding a processed signal input thereto; and
   (b) a signal processor for receiving the first output signal and generating said processed signal for input to said decoder, said signal processor including:
      i) pattern deletion means for deleting said non-bar-code pattern from the received first output signal based upon a set of temporal characteristics and for producing a second output including said bar code pattern; and
      ii) scaling means for receiving said second output and selectively scaling said bar code pattern when any one of the pulses within said bar code pattern is greater than a predetermined value.

2. The system claimed in claim 1, wherein said pattern deletion means includes ratio computation means for computing a ratio of said set of temporal characteristics of adjacent ones of said pulses within the bar code and non-bar-code patterns of the received first output signal.

3. The system claimed in claim 1, wherein said pattern deletion means includes ratio computation means for computing a ratio of said set of temporal characteristics of non-adjacent pulses within the bar code and non-bar code patterns of the received first output signal.

4. The system claimed in claim 1, wherein said pattern deletion means includes first ratio computation means for computing a ratio of said set of temporal characteristics of adjacent ones of said pulses within the bar code and non-bar code patterns of the received first output signal and second ratio computation means for computing a ratio of said set of temporal characteristics of non-adjacent ones of said pulses within the bar code and non-bar code patterns of the received first output signal.

5. The system claimed in claim 1, wherein said signal processor examines a respective individual time duration of each of said patterns.

6. The system claimed in claim 5, wherein said signal processor includes ratio computation means for computing a ratio of time durations of adjacent patterns.

7. The system claimed in claim 5, wherein said signal processor includes ratio computation means for computing a ratio of time durations of non-adjacent patterns.

8. The system claimed in claim 5, wherein said signal processor includes first ratio computation means for computing a ratio of time durations of adjacent patterns and second ratio computation means for computing a ratio of time durations of non-adjacent patterns.

9. The system claimed in claim 1, wherein said signal processor includes processing circuitry for examining the first output signal against a predetermined time-based criteria.

10. The system claimed in claim 1, wherein said signal processor is adapted for generating said processed signal for input to said decoder of respective different bar code symbologies.

11. A signal processor for processing a first output signal comprising a bar code pattern and a non-bar-code pattern, each one of said patterns comprising a number of pulses, said signal processor comprising:
   i) pattern deletion means for deleting said non-bar code pattern from the received first output signal based upon a set of temporal characteristics and for producing a second output including said bar code pattern; and
   ii) scaling means for receiving said second output from said pattern deletion means and for selective scaling of said bar code pattern when one of the pulses within said bar code pattern is greater than a predetermined value.

12. The processor of claim 11, wherein said pattern deletion means includes ratio computation means for computing a ratio of said temporal characteristics of adjacent pulses within the bar code and non-bar code patterns of the received first output signal.

13. The processor claimed in claim 11, wherein said pattern deletion means includes ratio computation means for computing a ratio of temporal characteristics of non-adjacent pulses within the bar code and non-bar code patterns of the received first output signal.

14. The processor claimed in claim 11, wherein said pattern deletion means includes first ratio computation means for computing a ratio of temporal characteristics of adjacent pulses of bar code and non-bar code patterns within the received first output signal and second ratio computation means for computing a ratio of temporal characteristics of non-adjacent pulses of the bar code and non-bar-code patterns within the received first output signal.

15. The system claimed in claim 11, wherein said signal processor examines a respective individual time duration of each said patterns.

16. The system claimed in claim 15, wherein said signal processor includes ratio computation means for computing a ratio of time durations of adjacent patterns.

17. The system claimed in claim 15, wherein said signal processor includes ratio computation means for computing a ratio of time durations of non-adjacent patterns.

18. The system claimed in claim 15, wherein said signal processor includes first ratio computation means for computing a ratio of time durations of adjacent patterns and second ratio computation means for computing a ratio of time durations of non-adjacent patterns.

19. A system comprising:
   (a) an electro-optical scanner adapted for reading a bar code indicia and a non-bar code indicia adjacent said bar code indicia, and generating a first output signal comprising a bar code pattern and a non-bar-code pattern, each one of said patterns comprising a number of pulses; and
   (b) a signal processor for receiving and processing the first output signal, said signal processor comprising:
      i) pattern deletion means for deleting said non-bar-code pattern from the received first output signal based upon a set of temporal characteristics and for producing a second output including said bar code pattern; and
      ii) scaling means for receiving said second output from said pattern deletion means and selectively scaling said bar code pattern when one of the pulses within said bar code pattern is greater than a predetermined value.

20. The invention of claim 19, wherein said pattern deletion means includes ratio computation means for computing a ratio of said temporal characteristics of adjacent pulses within the bar code and non-bar-code patterns of the received first output signal.

21. The invention claimed in claim 19, wherein said pattern deletion means includes ratio computation means for computing a ratio of temporal characteristics of non-adjacent pulses within the bar code and non-bar-code patterns of the received first output signal.

22. The invention claimed in claim 19, wherein said pattern deletion means includes first ratio computation means for computing a ratio of temporal characteristics of adjacent pulses of the bar code and non-bar-code patterns within the received first output signal and second ratio computation means for computing a ratio of temporal characteristics of non-adjacent pulses of the bar code and non-bar-code patterns within the received first output signal.

23. The system claimed in claim 19, wherein said signal processor examines a respective individual time duration of each one of said patterns.

24. The system claimed in claim 23, wherein said signal processor includes ratio computation means for computing a ratio of time durations of adjacent ones of said patterns.

25. The system claimed in claim 23, wherein said signal processor includes ratio computation means for computing a ratio of time durations of non-adjacent ones of said patterns.

26. The system claimed in claim 23, wherein said signal processor includes first ratio computation means for computing a ratio of time durations of adjacent ones of said patterns and second ratio computation means for computing a ratio of time durations of non-adjacent ones of said patterns.

27. The invention claimed in claim 23, wherein said signal processor includes processing circuitry for examining the respective individual time durations of said patterns as against a predetermined time-based criteria.

28. The invention claimed in claim 19, wherein said signal processor includes processing circuitry for examining the first output signal as against a predetermined time-based criteria.

29. The invention claimed in claim 19, wherein said scanner is an omni-directional scanner.

30. A signal processor for processing a first output signal comprising a bar code pattern and a non-bar code pattern, each one of said patterns comprising a number of pulses, said signal processor comprising:
  i) pattern deletion means for deleting said non-bar code pattern from the received first output signal based upon a set of temporal characteristics, said pattern deletion means including ratio computation means for computing a ratio of said temporal characteristics of adjacent ones of said pulses within the bar code pattern and the non-bar code pattern of the received first output signal,
  and for producing a second output comprising said bar code pattern; and
  ii) scaling means for receiving said second output and selectively scaling said bar code pattern when one of the pulses within said bar code pattern is greater than a predetermined value.

31. A signal processor for processing a first output signal comprising a bar code and a non-bar-code patterns, each one of said patterns comprising a number of pulses, said signal processor comprising:
  i) pattern deletion means for deleting said non-bar code pattern from the received first output signal based upon a set of temporal characteristics, said pattern deletion means including ratio computation means for computing a ratio of said temporal characteristics of non-adjacent ones of said pulses within the bar code and non-bar-code patterns of the received first output signal, and for producing a second output comprising said bar code pattern; and
  ii) scaling means for receiving said second output and selectively scaling said bar code pattern when one of the pulses within said bar code pattern is greater than a predetermined value.

32. An apparatus for processing a first output signal comprising a bar code pattern and a non-bar-code pattern, each one of said patterns comprising a number of pulses, said apparatus comprising:
  (a) a decoder for decoding a processed signal input thereto; and
  (b) a signal processor for receiving the first output signal and generating said processed signal for input to said decoder, said signal processor including:
    i) pattern deletion means for deleting said non-bar-code pattern from the received first output signal based upon a set of temporal characteristics and for producing a second output including said bar code pattern; and
    ii) scaling means for receiving said second output and selectively scaling said bar code pattern when any one of the pulses within said bar code pattern is greater than a predetermined value.

33. A method for processing a first output signal comprising a bar code pattern and a non-bar-code pattern, each one of said patterns comprising a number of pulses, said method comprising the steps of:
  i) deleting said non-bar-code pattern from the received first output signal based upon a set of temporal characteristics;
  ii) producing a second output signal including said bar code pattern; and
  iii) selectively scaling said bar code pattern when one of the pulses within said bar code pattern is greater than a predetermined value.

* * * * *